United States Patent [19]

Hatanaka et al.

[11] Patent Number: 5,952,123
[45] Date of Patent: *Sep. 14, 1999

[54] ELECTRODE PLATES FOR LEAD-ACID BATTERY AND THEIR MANUFACTURING METHOD

[75] Inventors: Tsuyoshi Hatanaka, Fujidera; Katsuhiro Takahashi, Yahara; Yoshiaki Nitta, Hirakata; Kazuhiro Okamura, Osaka, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/675,184

[22] Filed: Jul. 3, 1996

[30] Foreign Application Priority Data

Jul. 4, 1995 [JP] Japan .................................. 7-168487

[51] Int. Cl.$^6$ ..................................................... H01M 4/62
[52] U.S. Cl. ........................................... 429/217; 429/225
[58] Field of Search .................................. 429/217, 245, 429/225

[56] References Cited

U.S. PATENT DOCUMENTS

| | | | |
|---|---|---|---|
| 3,395,043 | 7/1968 | Shoeld | 429/94 |
| 3,494,800 | 2/1970 | Shoeld | 29/623.1 |
| 4,110,519 | 8/1978 | Nilsson | 429/217 |
| 4,769,299 | 9/1988 | Nelson | 429/245 X |
| 4,902,589 | 2/1990 | Dahn et al. | 429/217 X |
| 5,368,961 | 11/1994 | Juergens | 429/245 X |
| 5,468,571 | 11/1995 | Fujimoto et al. | 429/217 |

FOREIGN PATENT DOCUMENTS 0601754  6/1994  European Pat. Off. .

*Primary Examiner*—Stephen Kalafut
*Attorney, Agent, or Firm*—Ratner & Prestia

[57] ABSTRACT

Electrode plates for a lead-acid battery have an active material layer using polyvinylidene fluoride as a binder formed on both sides of a substrate. The substrate is selected from the group consisting of a foil-like sheet made of pure lead or lead alloy and a polyester film that is lead-plated or covered with a conductive coating layer containing carbon powder, whose main ingredient is graphite as a conducting agent. The method of manufacturing provides a thin electrode plate that is suitable for use as a spirally-wound type of electrode plate. The resulting plates have excellent high-rate discharge characteristics and long cycle life. The electrode plates are manufactured in a high productivity process that uses neither pore-forming agents nor pore-forming processes.

9 Claims, 3 Drawing Sheets

ELECTRODE PLATES FOR LEAD-ACID BATTERY AND THEIR MANUFACTURING METHOD

BACKGROUND OF THE INVENTION

The present invention relates to electrode plates for a lead-acid battery, particularly to ones having excellent high-rate discharge characteristics and long life, and their manufacturing method.

DESCRIPTION OF THE PRIOR ART

Current paste type electrode plates are widely used for lead-acid batteries due to their good productivity in the manufacturing process. Paste type electrode plates are manufactured by filling the void spaces of a grid with a paste. The grid is made of lead or a lead alloy and formed of a casting, expanded metal, or punched metal. The paste is prepared by adding diluted sulfuric acid to lead powder and mixing them. The paste is then subjected to a curing and a drying process to form unformed electrode plates. After the paste-filling process, a soaking process may be inserted where the electrode plates are immersed in diluted sulfuric acid so lead sulfate is formed thereon, thus giving hardness. The soaking process is immediately followed by a drying process.

Next, the unformed electrode plates are subject to electrochemical formation by charging them in a diluted sulfuric acid electrolyte so the positive and negative electrodes are finally activated. The main ingredient of the lead powder is called litharge, which is lead monoxide PbO containing 15% to 35% by weight of metal lead Pb. A mixed paste of lead powder and diluted sulfuric acid has an appropriate hardness and shear strength, which results from lead sulfate becoming lead basic sulfates due to the presence of an excess PbO.

During the curing process, the paste within the grid becomes hard. As the oxidation of Pb proceeds and lead basic sulfate crystals grow, the water content thereof partially vaporizes, subsequently giving rise to a cementation phenomena which bonds the powder particles together, resulting in the grid becoming hard. During the charge and discharge cycle, a paste type positive electrode plate repeatedly expands and shrinks and eventually swells by producing fine particles so that the active material is dropped out from the grid, thus shortening the cycle life.

There are several approaches used to solve this problem. One example is adding bits of fiber that are cut from acid resisting synthetic fiber, such as polyvinyl chloride and polyester, to the paste for the positive electrode. Another example is proposed in U.S. Pat. No. 4,252,872, where a dispersion solution of polytetrafluoroethylene (PTFE) together with diluted sulfuric acid is added to lead powder and mixed, thereby making PTFE form fiber and consequently a mesh-type network involving active material particles, so as to avoid dropping out.

In a paste type negative electrode plate, due to the charge and discharge cycle, the active material particles become large by coagulation of the particles, tending to reduce the discharge capacity. To avoid such deterioration, barium sulfate $BaSO_4$ is added to the paste for the negative electrode plate, and acts as an expanding agent. Lignin, carbon powder, etc., may be added thereto to improve the high-rate discharge characteristics at low temperatures.

Paste type electrode plates used as a three-dimensional structure serving as a current collector and an active material holder, can be manufactured with an excellent productivity and a high cost-performance.

Recently, as a high output power supply for use in various electromotive tools, engine starters, electric vehicles, etc., cylindrical sealed lead-acid batteries have been proposed in U.S. Pat. No. 5,045,086 and U.S. Pat. No. 5,047,300 and U.S. Pat. No. 5,198,313, etc. The batteries consist of an electrode plate group, composed of thin positive and negative electrode plates, each having both sides of its non-perforated lead foil uniformly coated with a thin active material layer. The plates are separated by a separator and spirally wound. When a non-perforated thin conductive sheet or a low-opening-ratio perforated thin conductive sheet, is utilized as a substrate for a current collector and active material holder, a paste whose main ingredients are lead powder and diluted sulfuric acid is not suitable for use in forming thin active material layers on both sides of the substrate. This is because the paste changes its hardness due to its thixotropy, its fluidity becomes poor, and thus it is difficult to coat the paste on the surface of the substrate due to its being slippery.

Particularly, a paste which is made by adding and mixing PTFE to form a mesh-like network becomes like rubber, thus being unable to be pasted on the surface of the sheet substrate.

Consequently, in order to manufacture such a thin electrode plate utilizing a thin conductive sheet as a substrate, as previously described, a paint-like paste is coated on both sides of the foil-like substrate and is dried to form an active material layer. The paint-like paste is prepared by adding a solution obtained by dissolving a synthetic resin in an organic solvent to a raw powder of an active material such as lead powder, litharge PbO, red lead $Pb3O_4$.

In the drying process, the organic solvent vaporizes, serving as a binder to strongly bond the active material particles to themselves and the active material particles to the substrate, to form one body structure.

To adjust the thickness of the paint-like paste, the viscosity of the paste can be decreased or the moving speed of the substrate can be increased to decrease thickness. Thickness adjustment can be made during coating if a roller coater method is used and the space between rollers is adjusted, if a doctor knife method is used, or if a spraying method is used.

Polyvinyl chloride (PVC), polystyrene (PS), and the like, have been widely used as a synthetic resin binder because of their acid resistance and comparatively low price. However, these resins are so much apt to form film that, after the coating and drying process, the surfaces of a raw material powder of active material are covered with thin synthetic resin films. When such an electrode plate is immersed in an electrolyte solution, the raw powder of active material is difficult to get wet, seriously diminishing the utility of the active material.

If the content of the synthetic resin binder in the paint-like paste is decreased to solve this problem, the bonding strength is decreased and the strength of the electrode plate is reduced. The active material therefore is apt to be peeled off. Consequently, in the preparation of a paint-like paste, a water soluble material such as carboxymethyl cellulose (CMC) or polyethylene oxide (PEO) is added to,-the raw powder of active material.

After being coated and dried, this paste must be immersed in water to dissolve and remove the water soluble material, and to form pores in the active material layer.

To omit the above mentioned complicated process of forming pores, an object of the present invention is to provide an acid resisting, appropriate synthetic resin binder having a poor capability of forming film but a strong bonding strength. Another object of the present invention is to provide by means of a simple process, by selecting an appropriate raw powder of active material, electrode plates for the lead-acid battery having a long life and excellent high-rate discharge characteristics.

SUMMARY OF THE INVENTION

The present invention omits complicated processes of introducing and removing an additive for forming pores in the active material layer during the manufacturing process of electrode plates for the lead-acid battery. Both sides of a substrate consisting of a conductive sheet are coated with a paint-like paste and dried, forming a thin active material layer, thereby enhancing productivity. According to the present invention, an active material layer is formed on both sides of a substrate using polyvinylidene fluoride as a binder. The substrate consists of at least one kind of conductive sheet selected from a foil-like sheet made of pure lead or lead alloy and a polyester film that is lead plated or covered with a conductive coated layer containing carbon powder as a conducting agent. The main ingredient of carbon powder being graphite. These electrode plates and their manufacturing method provide electrode plates for a lead-acid battery having a long life and excellent high-rate discharge characteristics.

DESCRIPTION OF THE PREFERRED EMBODIMENTS

Figure 1:
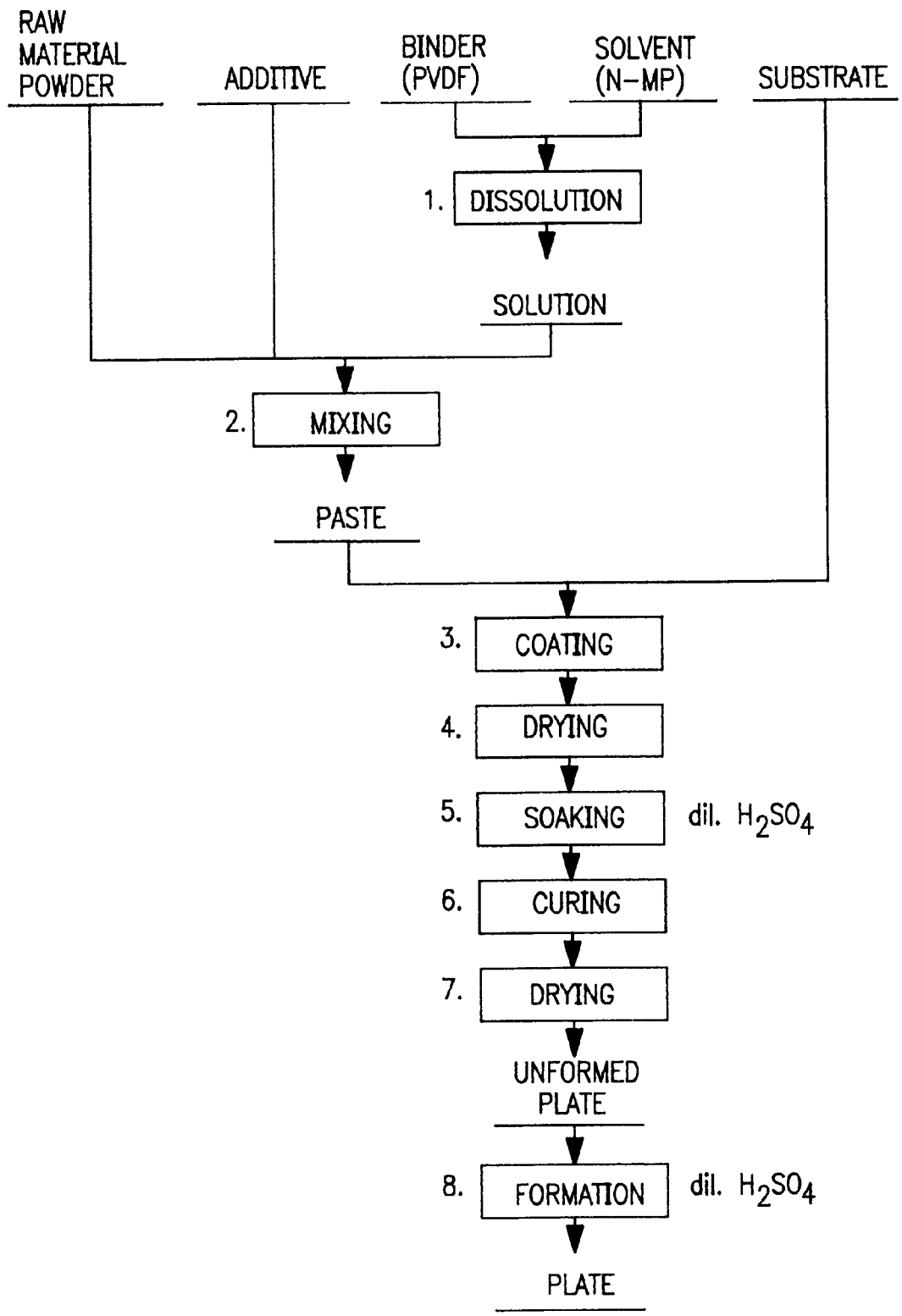
FIG. 1 is a flow chart of manufacturing electrode plates for a lead-acid battery according to the present invention.

Positive and a negative electrode plates for the lead-acid battery, according to each of the preferred embodiments of the present invention, were manufactured according to the flow chart in FIG. 1. The detail of each process in FIG. 1 is described below.

1. Dissolution Polyvinylidene fluoride (hereafter referred to as PVDF), selected as a binder in the present invention, is dissolved within a sole solvent, N-methylpyrrolidone (hereafter referred to as N-MP). Since PVDF is not dissolved in a short period of time, its solution of a specified concentration is prepared beforehand. The solubility of PVDF in N-MP is approximately 15% by weight. The following process varies the concentration of the binder is varied in accordance to achieve a proper viscosity of the paint-like paste and content of binder in the active material layer.

2. Mixing Lead powder is often used as a raw powder of active material. If it is necessary to enhance the porosity of the finished electrode plates, litharge PbO and/or lead sulfates are added and mixed with the lead powder. The lead sulfates referred to in the present invention include not only $PbSO_4$ but also basic lead sulfates such as 1-basic and 3-basic lead sulfates.

In all the preferred embodiments of the present invention, 2.0% by weight of PVC fiber bits of 2 to 3 mm in length are added to the paste for the positive electrode, while 2.0% by weight barium sulfate, 1.0% by weight carbon black and 0.5% by weight lignin are added to the paste for the negative electrode. The raw powders of active material for the positive and negative electrode plates and the additives are mixed, then the N-MP solution of PDVF is poured and mixed into them. Thus, paint-like pastes are prepared for the positive and the negative electrodes.

3. Coating

With the separation between rollers of a roll coater adjusted, both sides of the substrate are coated separately with the pastes for the positive and the negative electrodes. For each of the positive and negative electrodes, both sides of the substrate are coated with a quantity of active material corresponding to a theoretical capacity of 60 mAh per 1 $cm^2$ of substrate.

4. Drying

The solvent N-MP is evaporated and the paste dried by heating at a temperature of 70° C. to 80° C. The dissolved PVDF deposits and solidifies. This binds the raw powders of active material to themselves and the raw powder of active materials to the substrate.

5. Soaking

The electrode plates are immersed in an aqueous solution of 21% by weight sulfuric acid for 5 minutes.

6. Curing

The electrode plates are cured for about 1 hour in the atmosphere at a temperature as high as 70° C. and a relative humidity as high as 80 to 100%.

7. Drying

The electrode plates are left in the atmosphere at a relative humidity below 50% and a temperature over 80° C. for about 2 hours, thereby obtaining unformed electrode plates, 8. Formation Both the positive and the negative electrode plates have a size of 25 $cm^2$, each having a theoretical capacity of 1.5 Ah. An electrode group is created by alternately piling three negative electrode plates and two positive electrode plates that are separated by glass mat separators. They are contained in a polypropylene (PP) resin cell container, and diluted sulfuric acid of about 1.20 in specific gravity is poured into it. Then container formation is conducted by a charge rate of 0.2C (0.6A) for 7.5 hours (4.5 Ah).

The First Embodiment

Lead powder containing 75% by weight litharge was used for a raw powder of active material for both a positive and a negative electrode.

In this embodiment, the substrates for the positive and negative electrodes are non-perforated, foil-like sheets made of pure lead of 0.2 mm thickness. The active material for a positive electrode plate is peeled off by the charge and discharge cycle, thereby lowering the capacity and shortening the cycle life. In this embodiment, the PVDF binder content in the active material layer was widely varied and the effect was studied.

After the final forming process shown in the flow chart of FIG. 1, the electrolyte in the cell container was replaced by diluted sulfuric acid with a specific gravity of 1.28. The electrolyte volume was adjusted to not give rise to free electrolyte. A PP resin cover with positive and negative terminals and a safety valve was used. The lead plates of the positive and the negative electrode plates were welded to the terminals. Then the cover and the cell container were thermally welded and joined together, and sealed to get a finished cell.

For each different PVDF content, 5 cells were prepared and cycle life tested During the test, cells were repeatedly discharged at a rate of 1 C (3A) at a temperature of 20° C. for 15 minutes and charged at a constant current of 3 A and a specified voltage of 2.50 V for 45 minutes. The capacities were measured by discharging at 0.3 A down to 1.8 V after every 50 cycles of charge and discharge. The life was determined by the average number of charge and discharge cycles performed before the capacity was reduced to 50% of its initial value.

Figure 2:
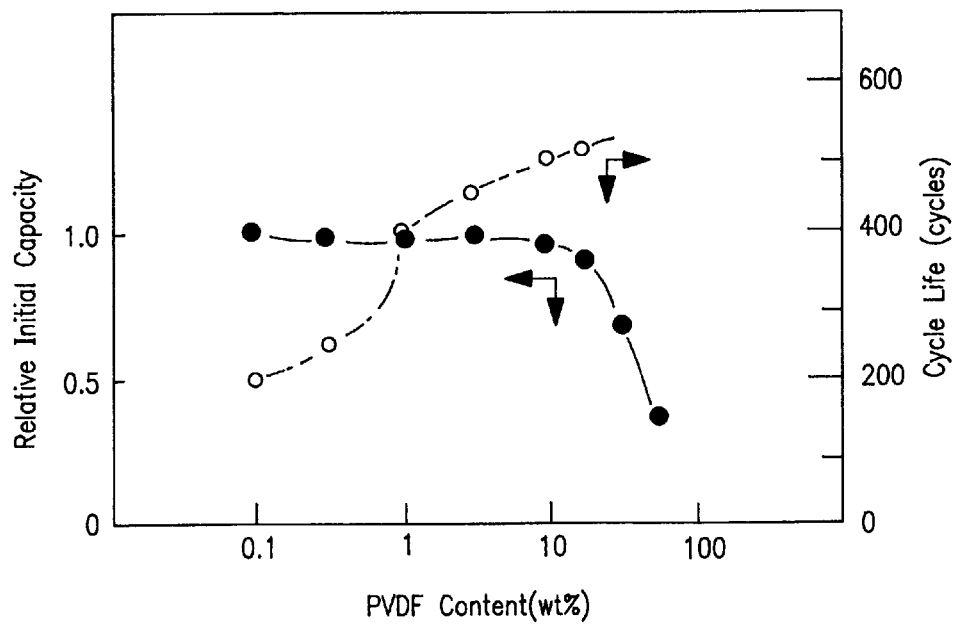
FIG. 2 shows an example representing the relationships between the relative value of initial capacity, the cycle life, and the content of polyvinylidene fluoride as a binder in the active material layer of a positive electrode plate for a lead-acid battery.

The result is shown in FIG. 2. The figure is an example representing the relative initial capacity and the cycle life as a function of the content of PVDF binder contained in the active material layer for the positive electrode plate according to the present invention. The initial capacity at a PVDF content of 0.1% by weight is fixed as 1.0 while the others are expressed in relative values. It can be seen from the initial capacity and the cycle life that a PVDF content of 1% to 10% by weight is appropriate.

The state of the PVDF binder in the active material layer can be observed under an optical microscope after the following procedure: after a forming process 8 a positive electrode plate is rinsed in water and dried, then it is immersed in a solution prepared with 50 grams of mannitol, 30 grams of sodium hydroxide, and 0.65 grams of hydrazine sulfate, dissolved in 1.0 liter of water, thereby being deprived of lead oxides. It can be seen that between active material particles themselves and between active material particles and the substrate, PVDF binder exists as isolated, fine particles, which helps bind them to a monoblock. As long as the PVDF content is not high, the surfaces of active material particles are not covered with PVDF. For a PVDF content of 1% to 10% by weight, electrical conductivity and chemical reactions such as diffusion of the solution between active material particles themselves and between active material particles and the substrate, were not hindered. But, for a PVDF content of 1% by weight, the cycle life was shortened due to the shortage of binder.

The detailed description was made for the positive electrode plate, and similarly the PVDF content of 1% to 10% by weight was found appropriate for the negative electrode plate.

The Second Embodiment

In the first embodiment, the content of litharge in the raw powder of active material was fixed to 75% by weight. The second embodiment studied the effect of the content of litharge in the raw powder of active material upon the cycle life of the positive electrode plate. Raw powders of active material containing a desired content of litharge were prepared by mixing lead powder containing a low content of litharge with litharge. Pastes were prepared by using an N-MP solution containing 10% by weight of PVDF as a binder.

Figure 3:
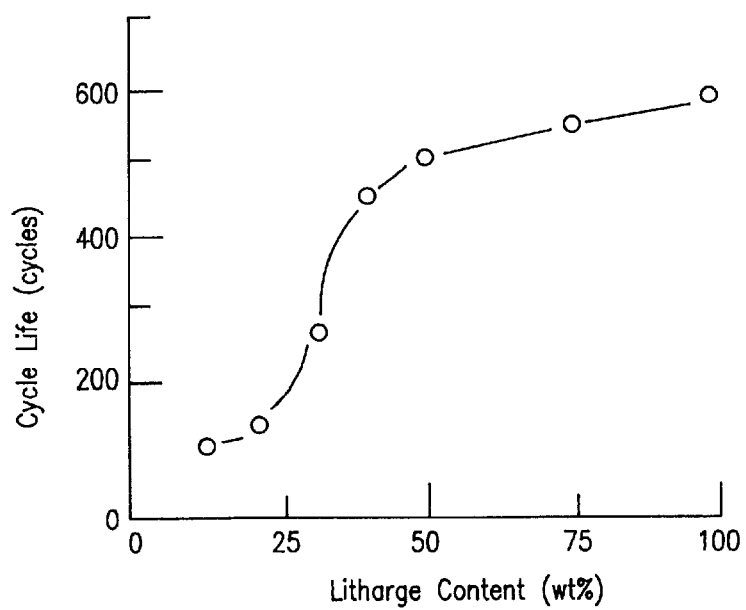
FIG. 3 shows the relationship between cycle life and the content of litharge in the raw powder of active material on a positive electrode plate for a lead-acid battery.

Positive and negative electrode plates were then made in the same manner as in the first embodiment, and after the cells were fabricated they underwent a cycle life test under the same conditions. The result is shown in FIG. 3. The figure shows the relationship between the cycle life and the content of litharge in the active material layer of the positive electrode plate according to the present invention.

It will be understood from FIG. 3 that a litharge content of not less than 50% by weight gives a long cycle life. However, if litharge content becomes too high, the density of the active material of the positive electrode plate decreases, thereby reducing the capacity. Therefore, taking into account both cycle life and capacity of the positive electrode plate, the preferable content of litharge in the raw powder of active material of the positive electrode plate is in the range of 60% to 80% by weight.

The Third Embodinent

In the third embodiment, the effect of the material and the presence of perforation of the substrate upon cycle life was studied. Raw powder of active material was prepared the same way as in the first embodiment by using lead powder containing 75% by weight of litharge, and N-MP solution containing 10% by weight of PVDF. The quantity of the solution was adjusted to obtain a PVDF binder content of 3% by weight in the active material layer of the electrode plate. The paint-like paste was then coated on the following 5 types of substrates.

A: a foil-like sheet made of pure lead of 0.20 mm thickness.

B: a foil-like sheet made of pure lead 0.20 mm thick perforated so that the diameter of a through-hole is 1 mm and the opening ratio (or aperture) is about 20%.

C: a foil-like sheet made of lead alloy containing 0.5% by weight of tin of 0.20 mm thickness.

D: a polyester film of 0.10 mm thickness, lead plated by a chemical plating method.

E: a polyester film of 0.10 mm in thickness, coated and dried on both sides with a conductive paint which was prepared by adding acetylene black to graphite powder.

For comparison, a sixth substrate F, was prepared as a prior art example as follows: both sides of an A sheet were coated with a paint-like paste and dried. The paste was prepared by adding and mixing a pore-forming agent containing 5% by weight CMC, 10% by weight PS dissolved in a methyl ethyl ketone solution and lead powder containing 75% by weight litharge. The paste was then dried, immersed in warm water of about 60° C. for the CMC to flow out, dried again, and then pressed. Processed by the soaking process 5 and the subsequent steps of FIG. 1 of the same conditions, positive and negative electrode plates were finished. The resulting content of PS binder in the active material layer was 3% by weight.

Figure 4:
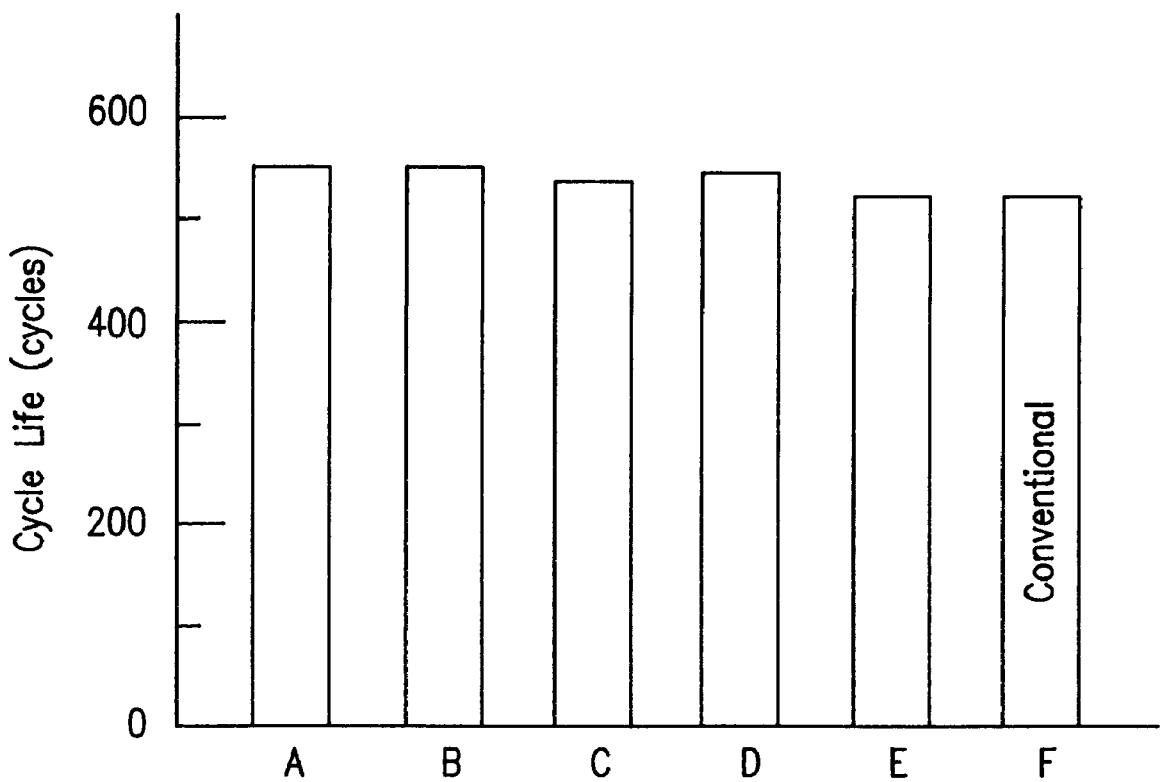
FIG. 4 shows the effect of various substrates on the cycle life of electrode plates for a lead-acid battery according to the present invention in comparison to a conventional lead acid battery.

Cells consisting of these six kinds of electrode plates were fabricated and subject to a cycle life test under the same conditions as in the first and the second embodiments. The results shown in FIG. 4, indicate that performance of electrode plates A through E for a lead-acid battery, is independent of the kind of the substrate, and by no means inferior to the conventional electrode plate F.

By utilizing PVDF as a binder and properly adjusting its content in the active material layer, it is not necessary to add a pore-forming agent as in the prior art, and it is possible to prevent a decrease in productivity due to a complicated pore-forming process. In addition, there is no difference in cycle life between substrates A and B.

Until now, non-perforated foil-like sheets made of pure lead or lead-tin alloy containing up to 0.50% by weight in have been recommended as substrates for thin electrode plates for lead-acid batteries. According to the present invention, substrate materials are no longer confined to these.

Although not described in the third embodiment, lead alloys such as Pb—Ca—Sn system, Pb—Ba—Sn system, Pb—Sr—Sn system, etc., can be rolled in foil-like form and used for the substrate of an electrode plate of a sealed lead-acid battery.

A polyester film can also be used as a substrate. Polyethylene terephtalate for example, can be lead plated or covered with a conductive coating layer containing an electrically conductive agent like carbon powder, to be used as a substrate.

A perforated sheet is preferred as a substrate so sulfuric acid, which is an electrolyte associated with the charge and discharge reaction at the positive and the negative electrode plates, can easily diffuse. A perforated substrate is easy to handle since the active material layers formed on both sides join each other via through-holes, strongly forming one body with the substrate.

If the diameter of through-holes is too large the charge and discharge reaction decreases. This is due to the conductive network of the active material not being sufficiently formed at the centers of holes. The diameter of through-holes should not exceed 2.0 mm.

As the opening ratio or aperture increases, substrate thickness should be larger for pulling strength and mechanical strength. To achieve thinner electrode plates, the opening ratio should not exceed 50%.

For a thin electrode plate whose thickness does not exceed 0.50 mm, a non-perforated conductive sheet can be used as a substrate because the thickness of active material layer is so small that no problem arises as to conductivity as well as charge and discharge reaction.

In addition to the use of a punched metal as a substrate, use of an expanded metal is possible without any difficulty, taking into account the same considerations.

A non-perforated substrate is useful for manufacturing a high voltage battery when pasting a positive active material layer on one side of a substrate and a negative active material layer on the other side, thus constructing a bipolar electrode.

In addition to thin electrode plates, electrode plates exceeding 0.50 mm in thickness can be used utilizing a paint-like paste containing PVDF as a binder according to the present invention. The substrate is made of a foil-like sheet of pure lead or lead alloy and is deformed on one or both sides with a plurality of ridge-like or bump-like projections. The thickness thereof is determined considering the height of these projections.

Ridge-like projections can be formed on a lead or lead alloy sheet when it is passed through and pressed between a pair of rollers whose surfaces have undergone a knurl treatment. Bump-like projections can be formed on a lead or lead alloy sheet when it is passed through and pressed between a pair of rollers which have concave-convex surfaces by an embossing treatment.

After the paste is applied, it is horizontally scribed at the tops of the projections of the substrate, thereby defining the thickness of the electrode plate.

When a substrate having ridge-like or bump-like projections is used for an electrode plate exceeding 0.50 mm in thickness, , the thickness of active material layer becomes relatively large. Therefore, use of a perforated substrate is preferable in consideration of the charge and discharge reaction.

The manufacturing method of a lead-acid battery, where the active material layer is formed on both sides of a substrate by using PVDF as a binder, was described in the flow chart of FIG. 1. The following additional remarks should be added.

For the soaking process 5, spraying diluted sulfuric acid instead of immersing the electrode plates in it will have the same effect.

For the curing process 6, the curing effect is enhanced if the atmosphere is replaced by gaseous carbon dioxide.

For a thin electrode plate, if the curing process 6 is omitted, or even if immediately after the drying process 4 the electrode plate is transferred as an unformed electrode plate to the forming process 8, an electrode plate having the same performance will be obtained.

For a positive electrode plate, in addition to using lead powder, litharge, or lead sulfates as a raw powder for the active material, the use of red lead or lead dioxide is effective for reducing forming time. It would be a disadvantage, due to its high material cost, to use high-purity red lead or lead dioxide. However, crude red lead obtained by partially oxidizing ordinary lead powder can be used with a low manufacturing cost, and is effective from the viewpoint of its reaction with sulfuric acid during the manufacturing process of the electrode plates.

If high-purity lead dioxide as prepared separately is used as a raw powder of active material, the electrode plate is to be used as a positive electrode plate after a drying process 4 of the flow chart of FIG. 1.

There are two kinds of lead dioxide, that is, $\alpha$ type and $\beta$-type. The former has a high electrode potential and low capacity while the latter has a low electrode potential and high capacity. The properties of both become the same by a later charge and discharge cycle treatment. Therefore, the selection of either as a starting material can be decided based on material cost.

Since electrode plates thus manufactured are relatively thin positive and a negative electrode plates with a separator inserted between them can be spirally wound and be contained in a cylindrical cell. A plurality of positive and negative electrode plates can be alternately piled up with separators inserted between them and contained in a rectangular cell.

In addition, , bipolar electrode plates can be piled up with separators inserted between them, thus enabling the realization of a high voltage battery.

Therefore, the present invention provides electrode plates for the lead-acid battery having a wide range of applications and great value in industry.

What is claimed:

1. An electrode plate for a lead-acid battery comprising:

a substrate made of a conductive sheet; and an active material layer formed on said substrate, said active material layer comprising polyvinylidene fluoride homopolymer as a binder and an active material containing lead.

2. An electrode plate for a lead-acid battery according to claim 1, wherein the content of polyvinylidene fluoride in the active material layer is in the range of 1% to 10% by weight.

3. An electrode plate for a lead-acid battery according to claim 1, wherein said conductive sheet of said substrate is made of a material selected from the group consisting of lead, a lead alloy of Pb—Sn system, a lead alloy of Pb—Ca—Sn system, a polyester film that is lead-plated, and a polyester film that is covered with a conductive coating layer containing carbon powder, wherein the main ingredient is graphite, as an electric conductor.

4. An electrode plate for a lead-acid battery in claim 1, wherein said conductive sheet of said substrate is made of a material selected from the group consisting of lead and a lead alloy, either one or both sides of which having ridge-like or bump-like projections.

5. An electrode plate according to claim 1, wherein said polyvinylidene fluoride homopolymer exists as isolated, fine particles between active particles themselves and between active material particles and the substrate.

6. In an electrode plate for a lead-acid battery the improvement comprising a substrate made of a conductive sheet with an active material layer formed on said substrate, said active material layer comprising polyvinylidene fluoride homopolymer as a binder.

7. An electrode plate according to claim 6, wherein the content of polyvinylidene fluoride homopolymer in the active material layer is in the range of 1% to 10% by weight.

8. An electrode plate according to claim 6, wherein said conductive sheet of said substrate is made of a material selected from the group consisting of lead, a lead alloy of Pb—Sn system, a lead alloy of Pb—Ca—Sn system, a polyester film that is lead-plated, and a polyester film that is covered with a conductive coating layer containing carbon powder, wherein the main ingredient is graphite, as an electric conductor.

9. An electrode plate according to claim 6, wherein said conductive sheet of said substrate is made of a material selected from the group consisting of lead and a lead alloy, either one or both sides of which having ridge-like or bump-like projections.

* * * * *

UNITED STATES PATENT AND TRADE MARK OFFICE
CERTIFICATE OF CORRECTION

PATENT NO.   : 5,952,123
DATED        : September 14, 1999
INVENTOR(S)  : Hatanaka et al.

It is certified that error appears in the above-identified patent and that said Letters Patent is hereby corrected as shown below:

In the Claims:

Column 8, line 55, after "fluoride" insert --homopolymer--.

Signed and Sealed this

Seventeenth Day of October, 2000

Attest:

Q. TODD DICKINSON

*Attesting Officer*          *Director of Patents and Trademarks*